US007428529B2

(12) United States Patent
Zeng et al.

(10) Patent No.: US 7,428,529 B2
(45) Date of Patent: Sep. 23, 2008

(54) TERM SUGGESTION FOR MULTI-SENSE QUERY

(75) Inventors: Hua-Jun Zeng, Beijing (CN); Benyu Zhang, Beijing (CN); Zheng Chen, Beijing (CN); Wei-Ying Ma, Beijing (CN); Li Li, Kirkland, WA (US); Ying Li, Bellevue, WA (US); Tarek Najm, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 424 days.

(21) Appl. No.: 10/825,894

(22) Filed: Apr. 15, 2004

(65) Prior Publication Data

US 2005/0234879 A1 Oct. 20, 2005

(51) Int. Cl.
*G06F 7/00* (2006.01)
*G06F 17/30* (2006.01)

(52) U.S. Cl. ........................ 707/3; 707/4; 707/5; 707/6; 707/7

(58) Field of Classification Search ..................... 707/3, 707/4-7, 102; 395/600; 704/9
See application file for complete search history.

(56) References Cited

U.S. PATENT DOCUMENTS

| | | | | |
|---|---|---|---|---|
| 5,297,042 | A * | 3/1994 | Morita | 707/5 |
| 5,418,948 | A * | 5/1995 | Turtle | 707/4 |
| 5,442,778 | A | 8/1995 | Pedersen et al. | |
| 5,488,725 | A * | 1/1996 | Turtle et al. | 707/5 |
| 5,694,592 | A | 12/1997 | Driscoll | |
| 5,812,134 | A | 9/1998 | Pooser et al. | |
| 5,819,258 | A * | 10/1998 | Vaithyanathan et al. | 707/2 |
| 5,845,278 | A | 12/1998 | Kirsch et al. | |
| 5,987,460 | A * | 11/1999 | Niwa et al. | 707/4 |
| 6,003,027 | A | 12/1999 | Prager | |
| 6,006,225 | A * | 12/1999 | Bowman et al. | 707/5 |
| 6,167,398 | A | 12/2000 | Wyard et al. | |
| 6,169,986 | B1 | 1/2001 | Bowman et al. | |
| 6,188,776 | B1 | 2/2001 | Covell et al. | |
| 6,226,408 | B1 | 5/2001 | Sirosh | |
| 6,298,351 | B1 | 10/2001 | Castelli et al. | |

(Continued)

FOREIGN PATENT DOCUMENTS

| | | |
|---|---|---|
| EP | 0809197 | 11/1997 |

(Continued)

OTHER PUBLICATIONS

Yeung et al., Improving Performance of Similarity-Based Clustering by Feature Weight Learning, Apr. 2002, IEEE, vol. 24, Issue 4, pp. 556-561.*

(Continued)

*Primary Examiner*—Apu Mofiz
*Assistant Examiner*—Jessica N Le
(74) *Attorney, Agent, or Firm*—Lee & Hayes, PLLC

(57) ABSTRACT

Systems and methods for related term suggestion are described. In one aspect, term clusters are generated as a function of calculated similarity of term vectors. Each term vector having been generated from search results associated with a set of high frequency of occurrence (FOO) historical queries previously submitted to a search engine. Responsive to receiving a term/phrase from an entity, the term/phrase is evaluated in view of terms/phrases in the term clusters to identify one or more related term suggestions.

43 Claims, 4 Drawing Sheets

U.S. PATENT DOCUMENTS

| | | | |
|---|---|---|---|
| 6,400,828 | B2 | 6/2002 | Covell et al. |
| 6,470,307 | B1 * | 10/2002 | Turney .......................... 704/9 |
| 6,556,983 | B1 | 4/2003 | Altschuler et al. |
| 6,615,209 | B1 | 9/2003 | Gomes et al. |
| 6,628,821 | B1 | 9/2003 | Covell et al. |
| 6,697,998 | B1 | 2/2004 | Damerau et al. |
| 6,711,585 | B1 | 3/2004 | Copperman et al. |
| 6,742,003 | B2 | 5/2004 | Heckerman et al. |
| 6,760,714 | B1 * | 7/2004 | Caid et al. .................... 706/14 |
| 6,772,120 | B1 | 8/2004 | Moreno et al. |
| 6,892,193 | B2 | 5/2005 | Bolle et al. |
| 6,944,602 | B2 | 9/2005 | Cristianini |
| 7,136,876 | B1 * | 11/2006 | Adar et al. ............... 707/104.1 |
| 2002/0178153 | A1 * | 11/2002 | Nishioka et al. ............... 707/3 |
| 2003/0046389 | A1 | 3/2003 | Thieme |
| 2003/0065632 | A1 | 4/2003 | Hubey |
| 2003/0110181 | A1 | 6/2003 | Schuetze et al. |
| 2003/0200198 | A1 * | 10/2003 | Chandrasekar et al. ......... 707/1 |
| 2003/0208482 | A1 * | 11/2003 | Kim et al. ...................... 707/3 |
| 2003/0233370 | A1 | 12/2003 | Barabas et al. |
| 2004/0010331 | A1 | 1/2004 | Terada et al. |
| 2004/0030556 | A1 | 2/2004 | Bennett |
| 2004/0117189 | A1 * | 6/2004 | Bennett ................... 704/270.1 |
| 2004/0249808 | A1 * | 12/2004 | Azzam et al. .................. 707/4 |
| 2005/0015366 | A1 * | 1/2005 | Carrasco et al. ................ 707/3 |
| 2005/0055321 | A1 | 3/2005 | Fratkina et al. |
| 2005/0097188 | A1 | 5/2005 | Fish |
| 2005/0216443 | A1 | 9/2005 | Morton et al. |

FOREIGN PATENT DOCUMENTS

| | | |
|---|---|---|
| EP | 1320042 | 6/2003 |

OTHER PUBLICATIONS

Huaizhong et al., Similarity Model and Term Association For Document Categorization, Sep. 2-6, 2002, IEEE, pp. 256-260.*

Attardi, G. et al.: "Automatic web Page Categorization by Link and context Analysis" Proceedings of THIA, European Symposium on Intelligence, 1999.

Brin S et al: "The anatomy of a large-scale hypertextual web search engine" Computer Networks and ISDN Systems, North Holland Publishing. Amsterdam, NL, vol. 30, No. 1-7, Apr. 1998, pp. 107-117.

Harmandas, V. et al. "Image Retrieval by Hypertext Links" Association For Computing Machinery. Proceedings of the 20th Annual INternational ACM-SIFIR Conference on Research and Development in INformation Retrieval. Philadelphia, PA, Jul. 27-31, 1997, pp. 296-303.

Smith, J.R. et al.: "An Image and Video Search Engine for the World-Wide Web" Storage and retrieval for image and video databases 5. San Jose, Feb. 13-14, 1997, Proceedings of SPIE, Bellingham, SpIE, US, vol. 3022, pp. 84-95.

Westerveld, T. et al: "Retriving Web Pages using Content, Links, URLs and Anchors" Test Retrieval Conference. Proceedings, XX, XX, Nov. 13, 2001,pp. 663-672.

Raghavan et al, "On the Reuse of Past Optimal Queries", SIGIR '95, Proceedings of the 18th Annual International ACM SIGIR Conference on Research and Development in Information Retrieval, Jul. 9, 1995, pp. 344-350.

Kim et al, "A Comparison of Collocation-Based Similarity Measures in Query Expansion", Information Processing & Management, Elsevier Science Ltd, vol. 35, No. 1, Jan. 1999 pp. 19-30.

Qiu et al, "Concept Based Query Expansion", SIGIR Forum, Association for Computing Machinery, New York, Jun. 27, 1993, pp. 160-169.

Beeferman D. & Berger A. "Agglomerative clustering of a search engine query log" Proceedings of the ACM SIGKDD. International cnference on Knowledge Discovery and Data Mining, ACM, US, 2000, pp. 407-416, XP002339640.

Srivastava et al. "Discovery and Applications of Usage Patterns from Web Data" Sigkdd Explorations, Jan. 2000 (2000-2001), pp. 12-23, XPoo2241892.

Slattery S. et al.; "Combining Statistical and Relational Methods for Learning in Hypertext Domains" Lecture Notes in Computer Science, 1998, pp. 38-52.

Chakrabarti S. "Data Mining for Hypertext: A tutorial survey" SIGKDD Explorations vol. 1 issue 2, Jan. 2000, 11 pages.

Cohn et al.; "The Missing Link—A Probabilistic Model of Document Content and Hypertext Connectivity" Proceedings of Neural Information Processing Systems, 2001, 7 pages.

Dhillon et al.; "Efficient Clustering of Very Large Document Collections" Data Mining,for Scientific and Engineering Applications, Chapter 1, Kluwer Academic Publishers, 2001, pp. 1-25.

Liu et al.; "Clustering Through Decision Tree Construction" 9th International Conference on Information and Knowledge Management, 2000, 10 pages.

Kleinberg J. M.; "Authoritative Sources in a Hyperlinked Environment" Proceedings of the ACM-SIAM Symposium on Discrete Algorithms, 1998, 34 pages.

Heer et al.; "Identification of Web User Traffic Composisiton using Multi-Modal Clustering and Information Scent" 1st SIAM ICDM Workshop on Web Mining. Chicago 2001. 13 pages.

Gibson et al.; "Inferring Web Communities from Link Topology" Proceedings of the 9th ACM Conference on Hypertext and Hypermedia, 1998, 17 pages.

Neville et al; "Iterative Classification in Relational Data" Proceedings AAAI-2000 Workshop on Learning Statistical Models from Relational Data, AAAI Press 2000, pp. 42-49.

Steinbach et al.; "A Comparison of Document Clustering Techniques" 6th ACM SIGKDD World Text Mining Conference Boston, 2000, 2 pages.

Su et al.; "Correlation-based Document Clustering using Web Logs" Proceedings of the 34th Hawaii International Conference on Sytem Sciences, 2001, 7 pages.

Taskar et al.; "Probabilistic Classification and Clustering in Relational Data" Proceedings of the 34th Hawaii International Conference on System Sciences. 2001. 7 pages.

Unger et al.; "Clustering Methods for Collaborative Filtering" In Workshop on Recommendation System at the 15th National Conference or Artificial Intelligence, 1998, 16 pages.

Wen et al.; "Query Clustering Using User Logs" ACM Transactions on Information Systems vol. 20 No. 1; Jan. 2002, pp. 59-81.

Zeng et al; "A Unified Framework for Clustering Heterogeneous Web Objects" Proceedings of the 3rd international Conference of Web Information System Engineering, Singapore 2002, 10 pages.

"Open Directory Project" http://dmoz.org/ Netscape 1998-2004 1 page.

Berkhim P.; "Survey of Clustering Data Mining Techniques" Accrue Software Inc.; 2002 pp. 1-56.

Yang et al.; "A Comparative Study on Feature Selection in Text Categorization" Proceedings of the Fourteenth International Conference on Machine Learning, Morgan Kaufmann Publishers Inc., San Francisco 1997, pp. 412-420.

Kim et al., "A Comparison of Collocation-Based Similarity Measure in Query Expansion", Inform ation Processing and Management, Elsevier, Garking, GB, vol. 35, No. 1, Jan. 1999, pp. 19-30.

McDonald, et al., "Evaluating a Content Based Image Retrieval System", SIGIR'01, Sep. 9-12, 2001, ACM, 2001, pp. 232-240.

Shaw, Term-Relevance Computautions and Perfecet Retrieval Performance Information Processing and Management, Elsevier, Barking, GB, vol. 31, No. 4, Jul. 1995, pp. 491-498.

Chen, et al., "Labeling Unclustered Categorical data into clusters based on the important attribute values", pp. 1-8.

Costa, et al, "Cluster analysis using self-organizing maps and image processing techniques", IEEE, vol. 5, 1999, pp. 367-372.

Dara, et al., "Clustering unlabeled data with SOMs improves classification of labeled real-world data", IJCNN, vol. 3, 2002, pp. 2237-2242.

Dasgupta, et al, "Homotopy-Based Semi-supervised hidden markov tree for texture analysis", IEEE, vol. 2, 2006, pp. 97-100.

Grira, et al., "Semi-supervised image database categorization using pairwise constraints", IEEE, vol. 3, 2005, pp. 1228-1231.

Gutfinger, et al., "Robust classifiers by mixed adaptation", IEEE, vol. 13, 1991, pp. 552-567.

Handl, et al., "Semi-supervised feature selection via multiobjective optimization", IJCNN, 2006. pp. 3319-3326.

Jean, et al, "A robust semi-supervised EM-based clustering algorithm with a reject option", vol. 3, pp. 399-402.

Jespersen, et al., "Evaluating the Markov Assumption for Web Usage Mining", ACM, 2003, pp. 82-89.

Jimenez, et al., "The Influence of Semantics in IR using LSI and K-means Clustering Techniques", retrieved on May 8, 2007 at <http://portal.acm.org/citation.cfm?id=963656&jmp=abstract &coll=ACM&dl=ACM&CDIF..>>, ACm, vol. 19, 2003, pp. 278-284.

Kang, et al., "Categorization and Keyword identificaitoj of unlabeled documents", IEEE, 2005, pp. 1-4.

Keswani et al. "Text classification with Enhanced Semi-Supervised Fuzzy Clustering", IEEE, vol. 1, 2002, pp. 621-626.

Lange, et al., "Learning with constrained and unlabelled data", IEEE, vol. 1, 2005, pp. 731-738.

Lee, et al., "Equilibrium-based support vector machine for semisupervised classification", IEEE, 2007, pp. 1-1.

Li, "Constrained Minimum cut for classification using labeled and unlabeled data", IEEE, vol. 2, 2001, pp. 597-602.

Li, et al., " Research and Design of an Efficient Collaborative Filtering Prediction Algorithm", IEEE, 2003, pp. 171-174.

Mahajan, et al, "Improved Topic-Dependent Language Modeling Using Information Retrieval Techniques", IEEE, 1999, pp. 541-544.

Morii, "A Generalized K-Means Algorithm with semi-supervised weight coefficients", ICPR, vol. 3, 2006, pp. 198-201.

Myka, et al., "On Automatic Similarity Linking in Digital Libraries", IEEE, 1997, 278-283.

Qun, et al., "Subspace Clustering and Label propagation for active feedback in image retrieval", MMM, 2005, pp. 172-179.

Santos, "Biased clustering methods for image classification", SIBGRAPI, 1998, pp. 278-285.

Shimosaka, et al., "Efficient margin-based query learning on action classification", IEEE, 2006, pp. 2778-2784.

Tang, et al., "Semi-Supervised Clustering of corner-oriented attributed Graphs", Hybrid intelligent Systems, 2006, pp. 33-33.

Wu, et al., "Clustering-training for data stream mining", IEEE, 2006, pp. 653-656.

* cited by examiner

TERM SUGGESTION FOR MULTI-SENSE QUERY

RELATED APPLICATIONS

This patent application is related to the following patent applications, each of which are commonly assigned to assignee of this application, and hereby incorporated by reference:

U.S. patent application Ser. No. 10/427,548, titled "Object Clustering Using Inter-Layer Link", filed on May 1, 2003; and U.S. patent application Ser. No. 10/826,159, titled "Reinforced Clustering of Multi-Type Data Objects for Search Term Suggestion", filed on Apr. 15, 2004.

TECHNICAL FIELD

Systems and methods of the invention pertain to data mining.

BACKGROUND

A keyword or phrase is a word or set of terms submitted by a Web surfer to a search engine when searching for a related Web page/site on the World Wide Web (WWW). Search engines determine the relevancy of a Web site based on the keywords and keyword phrases that appear on the page/site. Since a significant percentage of Web site traffic results from use of search engines, Web site promoters know that proper keyword/phrase selection is vital to increasing site traffic to obtain desired site exposure. Techniques to identify keywords relevant to a Web site for search engine result optimization include, for example, evaluation by a human being of Web site content and purpose to identify relevant keyword(s). This evaluation may include the use of a keyword popularity tool. Such tools determine how many people submitted a particular keyword or phrase including the keyword to a search engine. Keywords relevant to the Web site and determined to be used more often in generating search queries are generally selected for search engine result optimization with respect to the Web site.

After identifying a set of keywords for search engine result optimization of the Web site, a promoter may desire to advance a Web site to a higher position in the search engine's results (as compared to displayed positions of other Web site search engine results). To this end, the promoter bids on the keyword(s) to indicate how much the promoter will pay each time a Web surfer clicks on the promoter's listings associated with the keyword(s). In other words, keyword bids are pay-per-click bids. The larger the amount of the keyword bid as compared to other bids for the same keyword, the higher (more prominently with respect to significance) the search engine will display the associated Web site in search results based on the keyword.

In view of the above, systems and methods to better identify keywords relevant to Web site content would be welcomed by Web site promoters. This would allow the promoters to bid user preferred terms. Ideally, these systems and methods would be independent of the need for a human being to evaluate Web site content to identify relevant keywords for search engine optimization and keyword bidding.

SUMMARY

Systems and methods for related term suggestion are described. In one aspect, term clusters are generated as a function of calculated similarity of term vectors. Each term vector having been generated from search results associated with a set of high frequency of occurrence (FOO) historical queries previously submitted to a search engine. Responsive to receiving a term/phrase from an entity, the term/phrase is evaluated in view of terms/phrases in the term clusters to identify one or more related term suggestions.

BRIEF DESCRIPTION OF THE DRAWINGS

In the figures, the left-most digit of a component reference number identifies the particular figure in which the component first appears.

DETAILED DESCRIPTION

Overview

Figure 1:
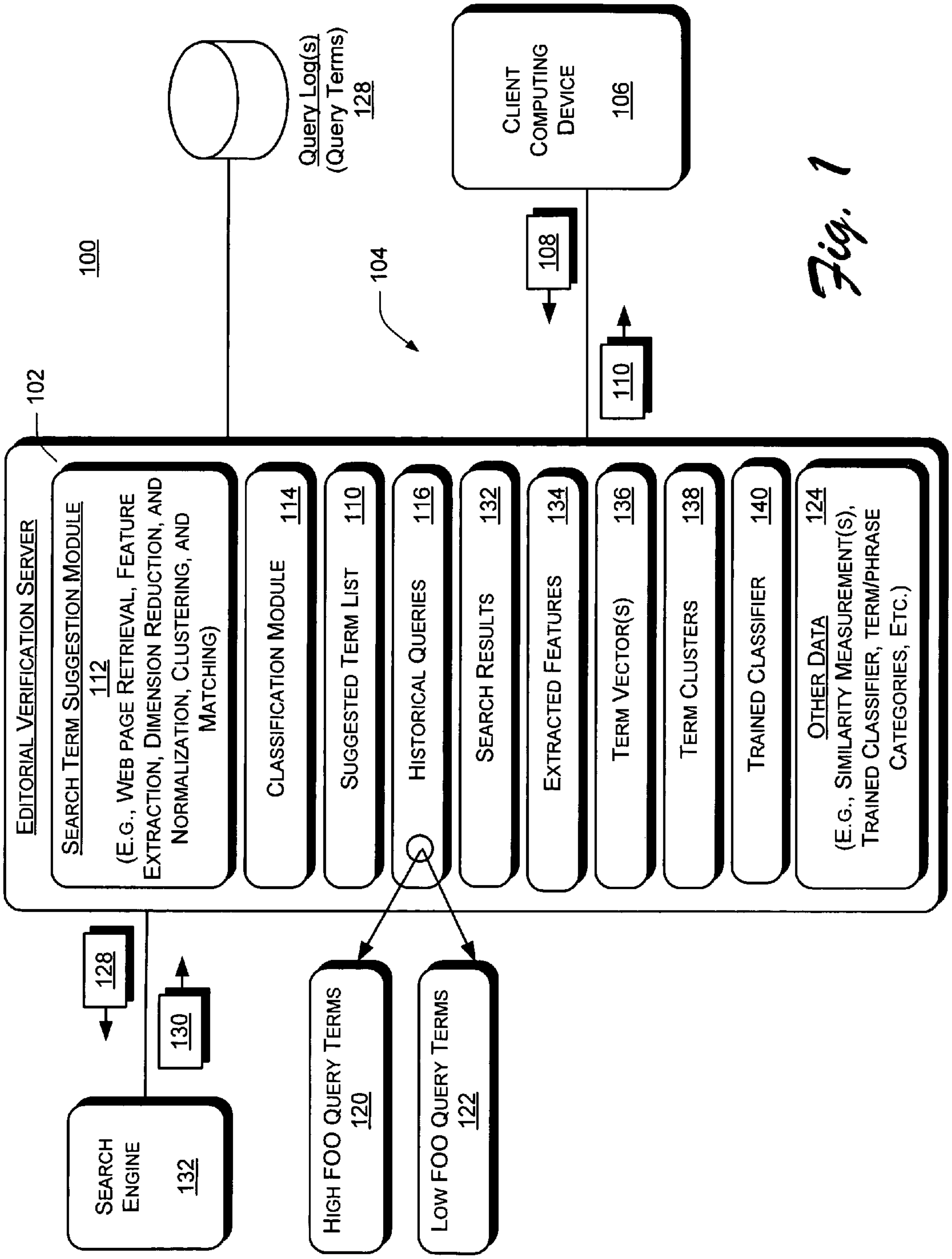
FIG. 1 illustrates an exemplary system for related term suggestion for multi-sense query.

It may appear that the simplest way to suggest related term/phrase is to use a substring matching approach, which judges two terms/phrases as related when one term/phrase includes some or all of the words of another term/phrase. However, this technique is substantially limited. This method may neglect many semantically related terms, because related terms need not to contain common words. For example, consider that a footwear corporation wants to know related terms for "shoe". If the conventional matching approach is used, only "women's shoes", "discount shoes", etc. will be suggested. However, many other related terms exist such as "sneakers", "hiking boots", "Nike", etc.

The following systems and methods for related term suggestion for a multi-sense query address these limitations of conventional substring matching techniques. To this end, the systems and methods mine search engine results for terms/phrases that are semantically related to an end-user (e.g., Web site promoter, advertiser, etc.) submitted terms/phrases. The semantic relationship is constructed by mining context (e.g., text, and/or so on) from the search engine results, the context surrounding a term/phrase that can cast light on term/phrase meaning. More particularly, a set of query terms is aggregated from a historical query log, with their frequency of occurrence (FOO) being counted. These query terms are submitted, one-by-one, to the search engine. In one implementation, the submitted the historical query log terms have a relatively high frequency of occurrence as compared to the frequency of occurrence of other historical query log terms.

Responsive to receiving respective ones of the submitted queries, the search engine returns a ranked list of search results, including URLs, result titles, and short descriptions of each result and/or context surrounding the submitted query. As search engine results are received, the systems and methods extract a set of features (keywords and the corresponding weights that are calculated using known TFIDF techniques) from select ones of the returned search results (e.g., one or more top-ranked results). After extracting features of corresponding search engine results from the submitted search queries, the extracted features are normalized. The normalized features are used to represent each submitted queries, and are used in a text clustering algorithm to group submitted query terms into clusters.

Responsive to receiving the term/phrase from the end-user, the term/phrase is compared to respective ones of the terms/phrases in the term clusters. Since the term clusters include terms that are contextually related to one another, when the term/phrase is compared to the terms within the clusters, the term phrase is evaluated in view of any multiple related contexts, or "senses." In one implementation, if a term/phrase matches a term from a cluster, the cluster is returned to the end-user in a suggested term list. The suggested term list includes terms/phrases determined to be semantically and/or contextually related to the term/phrase, respective term/phrase to term/phrase similarity measurements (confidence values), and respective term/phrase frequency of occurrence (FOO). The returned list is ordered by a combination of FOO and confidence value. If the term/phrase matches terms in more than a single term cluster, multiple suggested term lists are generated. The lists are ordered by the cluster sizes; and the terms within each list are ordered by a combination of FOO and confidence value. If no matching clusters are identified, the query term is further matched against expanded clusters generated from query terms with low FOO.

In one implementation, query terms with low FOO are clustered by training a classifier (e.g., a K-nearest neighbor classifier) for the term clusters generated from the high frequency of occurrence historical query log terms. Historical query terms determined to have low frequency of occurrence are submitted, one-by-one, to the search engine. Features are then extracted from select ones (e.g., a first top-ranked Web page, and/or so on) of the returned search results. The extracted features are normalized and used to represent the query terms with low FOO. The query terms are then classified into existing clusters to generate expanded clusters based on the trained classifier. The end-user submitted term/phrase is then evaluated in view of these expanded clusters to identify and return a suggested term list to the end-user.

These and other aspects of the systems and methods for related term/keyword suggestion for a multi-sense query are now described in greater detail.

An Exemplary System

Turning to the drawings, wherein like reference numerals refer to like elements, the systems and methods for related term suggestion for multi-sense query are described and shown as being implemented in a suitable computing environment. Although not required, the invention is described in the general context of computer-executable instructions (program modules) being executed by a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

FIG. 1 shows an exemplary system 100 for related term suggestion for multi-sense query. In this implementation, system 100 includes editorial verification server (EVS) 102 coupled across a network 104 to client computing device 106. Responsive to receiving a term/phrase 108, for example from client computing device 106 or another application (not shown) executing on EVS 102, EVS 102 generates and communicates suggested term list 110 to the client computing device 106 to allow an end-user to evaluate a set of terms semantically/contextually related to the term/phrase 108 prior to actually bidding on the term/phrase. Network 104 may include any combination of a local area network (LAN) and general wide area network (WAN) communication environments, such as those which are commonplace in offices, enterprise-wide computer networks, intranets, and the Internet. When system 100 includes a client computing device 106, the client computing device is any type of computing device such as a personal computer, a laptop, a server, a mobile computing device (e.g., a cellular phone, personal digital assistant, or handheld computer), etc.

A suggested term list 110 includes, for example, terms/phrases determined to be related to the term/phrase 108, respective term/phrase to term/phrase 108 similarity measurements (confidence values), and respective term/phrase frequency of occurrence (FOO)—frequency in the historical query log. Techniques for identifying related terms/phrases, generating similarity measurements, and generating FOO values are described in greater detail below in reference to sections titled keyword mining, feature extraction, and term clustering.

TABLE 1 shows an exemplary suggested term list 110 of terms determined to be related to a term/phrase 108 of "mail." Terms related to term/phrase 108 are shown in this example in column 1, titled "Suggested Term."

TABLE 1

AN EXEMPLARY SUGGESTED TERM LIST FOR THE BID TERM "MAIL"

| Suggested Term | Similarity | Frequency | <Context> |
|---|---|---|---|
| hotmail | 0.246142 | 93161 | online e-mail |
| yahoo | 0.0719463 | 165722 | related |
| mail.com | 0.352664 | 1455 | |
| yahoo mail | 0.0720606 | 39376 | |
| www.mail.com | 0.35367 | 711 | |
| email.com | 0.484197 | 225 | |
| www.hot | 0.186565 | 1579 | |
| www.msn.com | 0.189117 | 1069 | |
| mail.yahoo.com | 0.0968248 | 4481 | |
| free email | 0.130611 | 1189 | |
| www.aolmail.com | 0.150844 | 654 | |
| check mail | 0.221989 | 66 | |
| check email | 0.184565 | 59 | |
| msn passport | 0.12222 | 55 | |
| www.webmail.aol.com | 0.0800538 | 108 | |
| webmail.yahoo.com | 0.08789 | 71 | |
| free email account | 0.0836481 | 65 | |
| mail | 1 | 2191 | Traditional mail |
| usps | 0.205141 | 4316 | related |
| usps.com | 0.173754 | 779 | |
| united parcel service | 0.120837 | 941 | |
| postal rates | 0.250423 | 76 | |
| stamps | 0.156702 | 202 | |
| stamp collecting | 0.143618 | 152 | |
| state abbreviations | 0.104614 | 300 | |
| postal | 0.185255 | 66 | |
| postage | 0.180112 | 55 | |
| postage rates | 0.172722 | 51 | |
| usps zip codes | 0.138821 | 78 | |
| us postmaster | 0.109844 | 58 | |

Referring to TABLE 1, note that terms in the suggested term list are mapped to term similarity values (see, column 2, titled "Similarity") and frequency of occurrence scores (see, column 3, titled "Frequency"). Each term similarity value, calculated as described below in the section titled "Term Clustering", provides a similarity measure between a corresponding suggested term (column 1) and the term/phrase 108, which is "mail" in this example. Each frequency value, or score, indicates the number of times that the suggested term occurs in the historical query log. The suggested term list is sorted as a function of term similarity, and/or frequency of occurence scores as a function of business goals.

Any given term/phrase 108 (e.g., mail, etc.) may have more than a single context within which the bid term may be used. To account for this, STS model 112 provides an indication in suggested term list 110 of which suggested terms correspond to which of the multiple contexts of term/phrase 108. For example, referring to TABLE 1, the term/phrase 108 of "mail" has two (2) contexts: (1) traditional off-line mail and (2) online e-mail. Note that a respective list of related terms is shown for each of these two bid term contexts.

Additionally, suggested terms for any term/phrase 108 may be more than synonyms of the bid term. For instance, referring to TABLE 1, the suggested term "usps" is an acronym for an organization that handles mail, not a synonym for the bid term "mail." However, "usps" is also a term very related to a "mail" bid term, and thus, is shown in the suggested term list 110. In one implementation, STS model 112 determines the relationship between a related term R (e.g. "usps") and a target term T (e.g. "mail") as a function of the following association rule: itr(T)→itr(R), wherein "itr" represents "interested in". If a user (advertiser, Web site promoter, and/or the like) is interested in R, the user will also be interested in T.

EVS 102 includes a number of computer-program modules to generate suggested term list 110. The computer-program modules include, for example, search term suggestion (STS) module 112 and classification module 114. STS module 112 retrieves a set of historical queries 116 from query log 118. The historical queries include search query terms previously submitted to a search engine. STS module 112 evaluates historical queries 116 as a function of frequency of occurrence to identify high frequency of occurrence (FOO) search terms 120 and relatively lower frequency of occurrence search terms 122. In this implementation, a configurable threshold value is used to determine whether a historical query has a relatively higher or low frequency of occurrence. For example, search query terms in historical queries 116 that occur at least a threshold number of times are said to have a high frequency of occurrence. Analogously, search query terms in historical queries 116 that occur less than the threshold number of time are said to have a low frequency of occurrence. For purposes of illustration, such a threshold value is shown as a respective portion of "other data" 124.

Keyword Mining and Feature Extraction

STS module 112 mines semantic/contextual meaning high frequency of occurrence query terms 120 by submitting each query, one-by-one (search query 128), to search engine 126. Responsive to receiving search query 128, search engine 126, returns a ranked listing (whose number is configurable) in search result 130 to STS module 112. The ranked listing includes URLs, result titles, and short descriptions and/or contexts of query term related to the submitted search query 128. The ranked listing is stored in the search results 132. Such search result retrieval is done for each search query 128.

STS module 112 parses Web page Hypertext Markup Language (HTML) to extract the URLs, result titles and short descriptions and/or contexts of the query term for each query term 120 from each retrieved search result 132. The URLs, result titles, short descriptions and/or contexts of the query term, and the search query 128 used to obtain the retrieved Search result 132 are stored by STS module 112 in a respective record of extracted features 134.

After parsing search results 130 for the high frequency of occurrence query terms 120, STS module 112 performs text preprocessing operations on extracted features 134 to generate linguistic tokens (tokenize) from the extracted features into individual keywords. To reduce dimensionality of the tokens, STS module 112 removes any stop-words (e.g., "the", "a", "is", etc.) and removes common suffixes to normalize the keywords, for example, using a known Porter stemming algorithm. STS module 112 arranges the resulting extracted features 134 into one or more term vectors 136.

Each term vector 136 has dimensions based on term frequency and inverted document frequency (TFIDF) scores. A weight for the $i^{th}$ vector's $j^{th}$ keyword is calculated as follows:

$$w_{ij}=TF_{ij}\times\log(N/DF_j)$$

wherein $TF_{ij}$ represents term frequency (the number of occurrences of keyword j in the $i^{th}$ record), N is the total number of query terms, and $DF_j$ is the number of records that contain keyword j.

Term Clustering

STS module 112 groups similar terms to generate term clusters 138 from term vectors 136. To this end, and in this implementation, given the vector representation of each term, a cosine function is used to measure the similarity between a pair of terms (recall that the vectors were normalized):

$$sim(q_j, q_k) = \sum_{i=1}^{d} w_{ij} \cdot w_{ik}$$

wherein d represents vector dimension, q represents a query, k is a dimension index. Thus, the distance between the two terms (a similarity measurement) is defined as:

$$\text{dist}(q_j, q_k)=1-\text{sim}(q_j, q_k)$$

Such similarity measurements are shown as a respective portion of "other data" 124. Exemplary such similarity values are shown in an exemplary suggested term list 110 of TABLE 1.

STS module 112 uses the calculated similarity measurement(s) to cluster/group terms represented by keyword vectors 134 into term cluster(s) 138. More particularly, and in this implementation, STS module 112 uses a known density-based clustering algorithm (DBSCAN) to generate term cluster(s) 138. DBSCAN uses two parameters: Eps and MinPts. Eps represents a maximum distance between points in a cluster 138. Here points are equivalent of vectors because each vector can be represented by the point of the vector's head when its tail is moved to the origin. MinPts represents a minimum number of points in a cluster 138. To generate a cluster 138, DBSCAN starts with an arbitrary point p and retrieves all points density-reachable from p with respect to Eps and MinPts. If p is a core point, this procedure yields a cluster 138 with respect to Eps and MinPts. If p is a border point, no points are density-reachable from p and DBSCAN visits the next point.

Term Matching

Responsive to receiving the term/phrase 108 from an end-user (e.g., an advertiser, Web site promoter, etc), STS module 112 compares the term/phrase 108 to respective ones of the terms/phrases in the term clusters 138. Since term clusters 138 include terms that are contextually related to one another, the term/phrase 108 is evaluated in view of multiple related and historical contexts, or "senses." In one implementation, if STS module 112 determines that a term/phrase 108 matches a term/phrase from a cluster 138, search term suggestion module 112 generates suggested term list 110 from the cluster 138. In this implementation, a match may be an exact match or a match with a small number of variations such as singular/plural forms, misspellings, punctuation marks, etc. The returned list is ordered by a combination of FOO and confidence value.

If STS module 112 determines that a term/phrase 108 matches terms in multiple term clusters 138, search term suggestion module 112 generates multiple suggested term lists 110 from terms in the multiple ones of term clusters 138. The lists are ordered by the cluster sizes; and the terms within each list are ordered by a combination of FOO and confidence value.

Classification of Low FOO Terms

Classification module 114 generates suggested term list 110 when term clusters 138 generated from high frequency of occurrence (FOO) query terms 120 do not include same terms to end-user input term/phrase 108. To this end, classification module 114 generates trained classifier 140 from term clusters 138 generated from high frequency of occurrence (FOO) query log terms 120. The terms in term clusters 138 already have corresponding keyword vectors in a vector space model suitable for classification operations. Additionally, stop-word removal and word stemming (suffix removal) reduced dimensionality of term vectors 136 (upon which clusters 138 are based). In one implementation, additional dimensionality reduction techniques, for example, feature selection or re-parameterization, may be employed.

In this implementation, to classify a class-unknown query term 120, classification module 114 uses the k-Nearest Neighbor classifier algorithm to find k most similar neighbors in all class-known query terms 120, relying on their corresponding feature vectors, and uses the a weighted majority of class labels of the neighbors to predict the class of the new query term. Here each query term already in term clusters 138 is assigned a label same to their corresponding clusters' label, while each cluster 138 is labeled by simple sequence numbers. These neighbors are weighted using the similarity of each neighbor to X, where similarity is measured by Euclidean distance or the cosine value between two vectors. The cosine similarity is as follows:

$$sim(X, D_j) = \frac{\sum_{t_i \in (x \cap D_j)} x_i \cdot d_{ij}}{\|X\|_2 \cdot \|D_j\|_2}$$

where X is the test term, i.e. the query term to be classified, represented as a vector; $D_j$ is the jth training term; $t_i$ is a word shared by X and $D_j$; $x_i$ is the weight of keyword $t_i$ in X; $d_{ij}$ is the weight of keyword $t_i$ in $D_j$; $\|X\|_2=\sqrt{x_2^2+x_2^2+x_3^2}$ is the norm of X, and $\|D_j\|_2$ is the norm of $D_j$. Thus, the class label of the test term X is the weighted majority of all neighbors' class labels:

$$\text{label}(X) = \underset{l_i}{\text{argmax}}\left(\sum_{\text{All } D_j \text{where lable}(D_j)=l_i} sim(X, D_i)\right)$$

In another implementation, a different statistical classification and machine learning technique (e.g., including regression models, Bayesian classifiers, decision trees, neural networks, and support vector machines) other than a nearest-neighbor classification technique is used to generate trained classifier 140.

Classification module 114 submits low frequency of occurrence (FOO) query terms 122, one-by-one (via a respective search query 128), to search engine 126. Responsive to receiving search result 130 associated with a particular search query 128, and using techniques already described, classification module 114 extracts features (extracted features 134) from one or more retrieved search results 132 identified by the search result 130. In this implementation, features are extracted from a first top-ranked Search result 132. For each retrieved and parsed Search result 132, classification module 114 stores the following information in a respective record of extracted features 134: the URLs, result titles, short descriptions and/or contexts of the query term, and search query 128 used to obtain the retrieved Search result 132. Next, classification module 114 tokenizes, reduces dimensionality, and normalizes extracted features 134 derived from low FOO query terms 122 to generate term vectors 136. Then, classification 114 clusters the query terms into a respective set of clusters 138. This clustering operation is performed using trained classifier 140 (generated from high FOO query terms 120).

Classification 114 evaluates end-user submitted term/phrase 108 in view of these expanded term clusters (generated based on low FOO query terms 122) to identify and return one or more suggested term lists 110 to the end-user. An exemplary such procedure is described above in paragraphs [0032] and [0033], and in the following section.

An Exemplary Procedure

Figure 2:
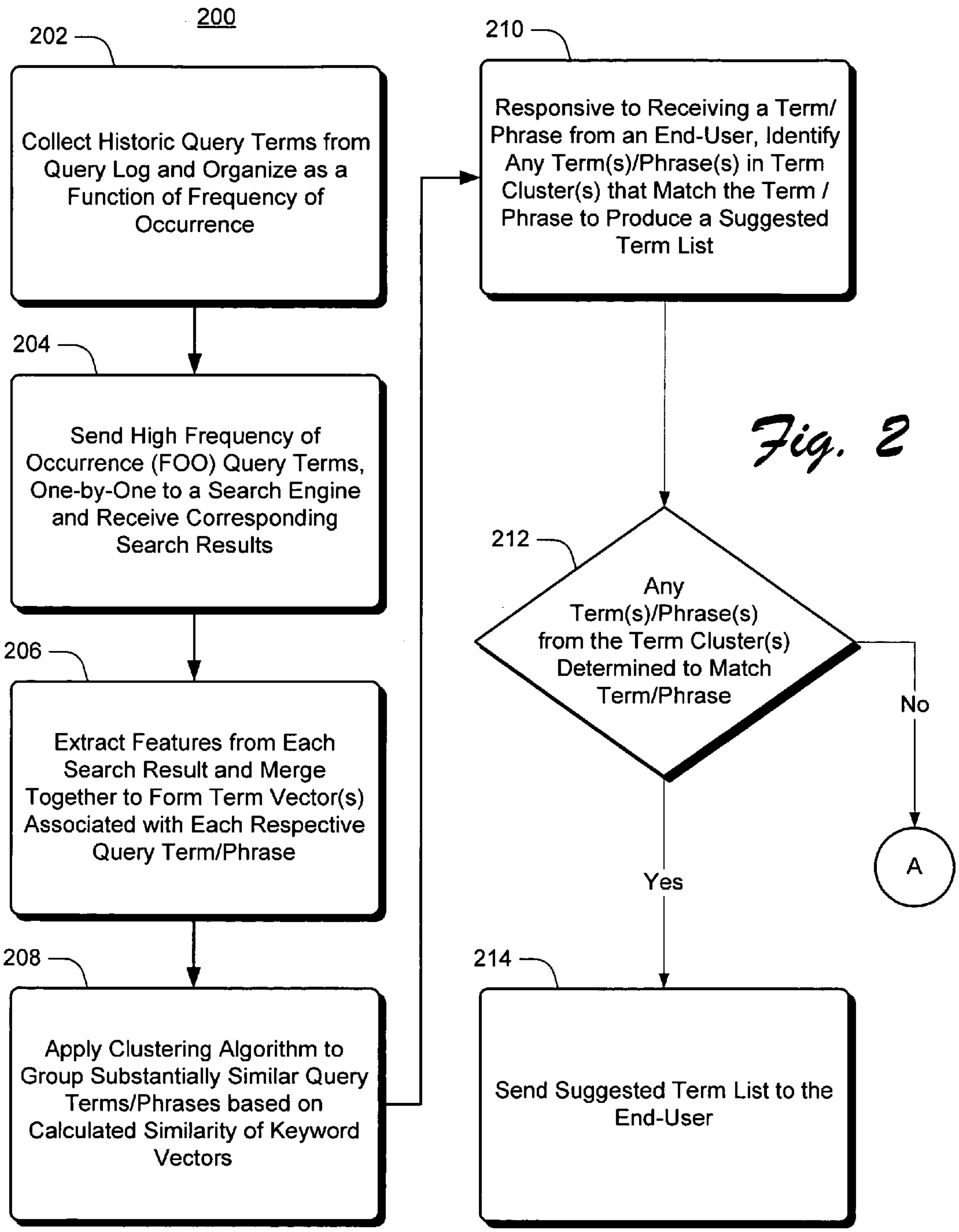
FIG. 2 illustrates an exemplary procedure for related term suggestion for multi-sense query.

FIG. 2 illustrates an exemplary procedure 200 for related term suggestion for multi-sense query. For purposes of discussion, operations of the procedure are discussed in relation to the components of FIG. 1. (All reference numbers begin with the number of the drawing in which the component is first introduced). At block 202, search term suggestion (STS) module 112 (FIG. 1) collects historic query terms 116 from query log 120. STS module 112 organizes the historical query is 116 as a function of frequency of occurrence. At block 204, STS module 112 sends high frequency of occurrence query terms 120 to search engine 132 and receives corresponding search results 130. At block 206, STS module 112 extracts snippet descriptions from each search result 130 and merges the snippet descriptions (extracted features 134) together to form term vectors 136. A respective term vector 136 is generated for each respective high frequency of occurrence query term 120.

At block 208, STS module 112 applies a clustering algorithm to group substantially similar terms based on term vectors 136 into term clusters 138. At block 210, responsive to receiving a term/phrase 108 from an end-user, STS module 112 generates a suggested term list 110 from any keywords/key phrases from the term clusters 138 determined to be substantially similar to the term/phrase 108. At block 212, STS module 112 determines whether any keywords/phrases from keyword clusters 138 were determined to be substantially similar to term/phrase 108. If so, the procedure continues at block 214, where in STS module 112 sends the suggested term list 110 to the end-user. Otherwise, the procedure continues at block 302 of FIG. 3 as shown by on-page reference "A".

Figure 3:
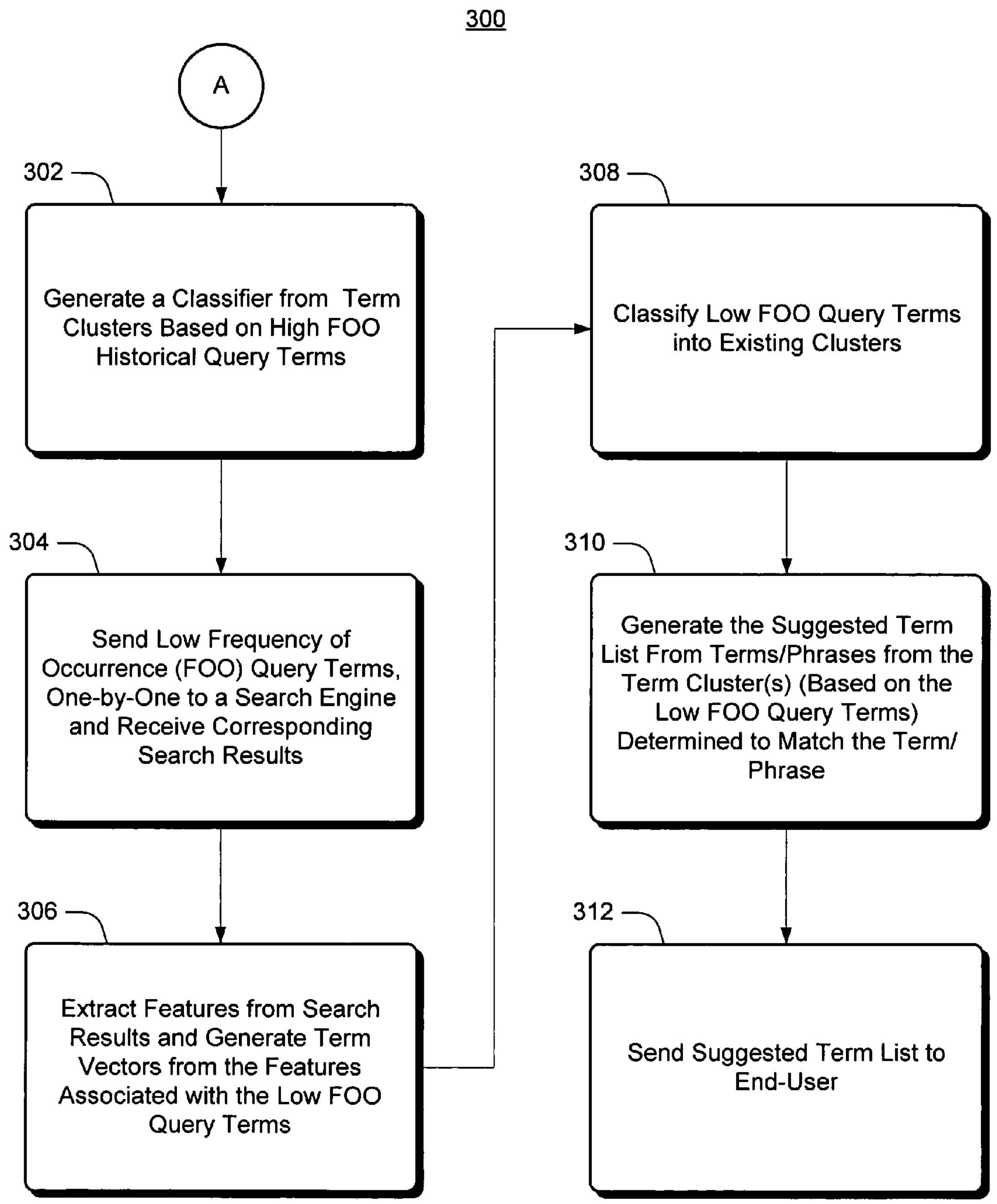
FIG. 3 illustrates an exemplary procedure for related term suggestion for multi-sense query. The operations of this procedure are based on the operations of FIG. 2.

FIG. 3 illustrates an exemplary procedure 300 for related term suggestion for multi-sense query. The operations of procedure 300 are based on the operations of procedure 200 of FIG. 2. For purposes of discussion, operations of the procedure are discussed in relation to the components of FIG. 1. (All reference numbers begin with the number of the drawing in which the component is first introduced). At block 302, STS module 112 generates a classifier 140 from term clusters 138, which at this time are based on high frequency of occurrence prairie terms 120. At block 304, STS module 112 sends low frequency of occurrence query terms 122, one by one, to search engine 132 and receives corresponding search results 130. At block 306, STS module 112 extracts snippet descriptions (extracted features 134) from the search results 130, and generates term vectors 136 therefrom. At block 308, STS module 112 classifies term vectors 136 generated from low frequency of occurrence quey terms 122 in view of the trained classifier 140 to generate respective term clusters 138 based on the low frequency of occurrence query terms.

At block 310, STS module 112 generates a suggested term list 110 from the keywords/key phrases from term clusters 138 based on the low frequency of occurrence prairie terms 122 that are determined to be substantially similar to the term/phrase 108. At block 312, STS module 112 sends the suggested term list 110 to the end-user.

An Exemplary Operating Environment

Figure 4:
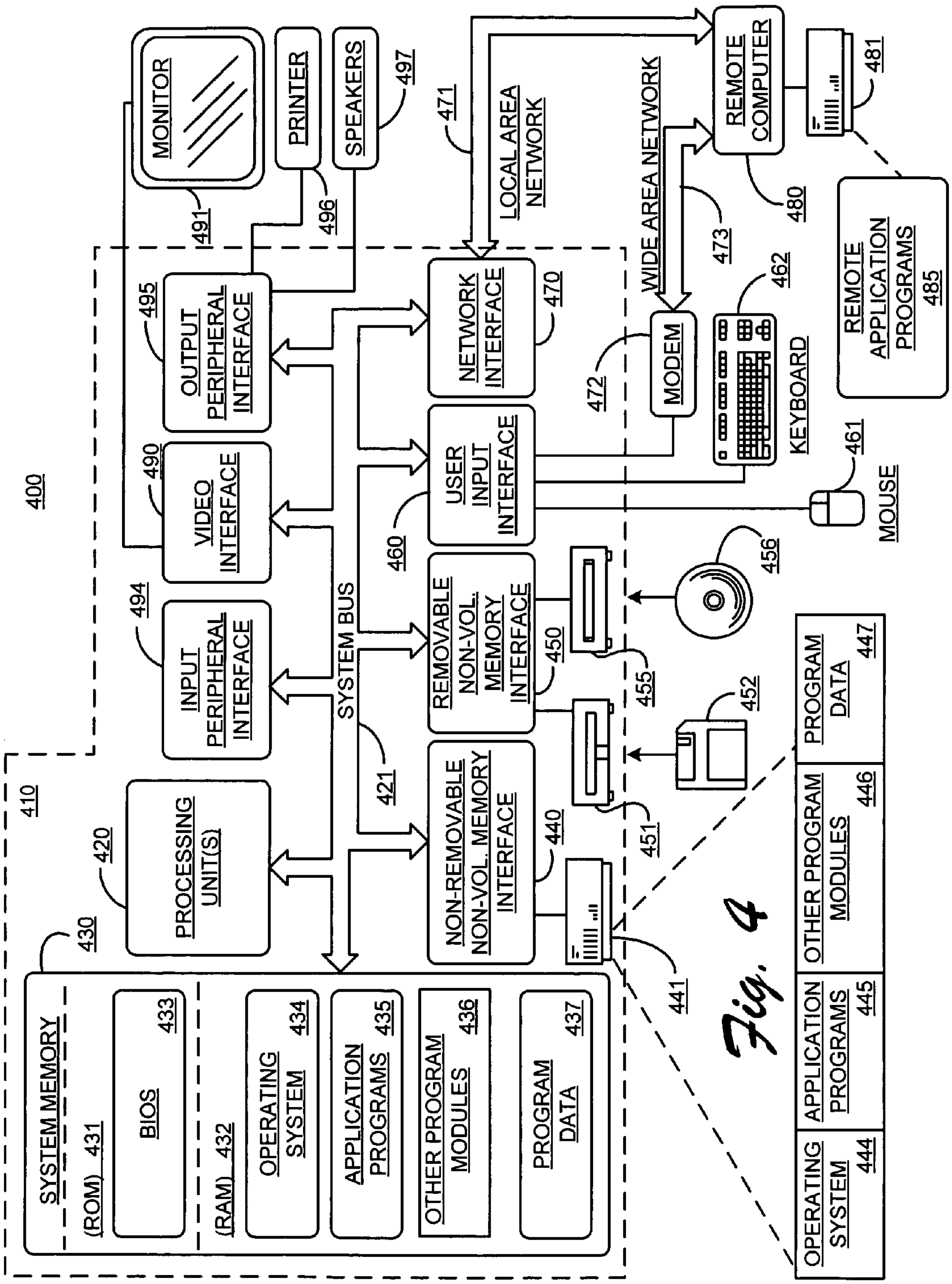
FIG. 4 shows an exemplary suitable computing environment on which the subsequently described systems, apparatuses and methods for related term suggestion for multi-sense query may be fully or partially implemented.

FIG. 4 illustrates an example of a suitable computing environment 400 on which the system 100 of FIG. 1 and the methodology of FIGS. 2 and 3 for related term suggestion for multi-sense query may be fully or partially implemented. Exemplary computing environment 400 is only one example of a suitable computing environment and is not intended to suggest any limitation as to the scope of use or functionality of systems and methods the described herein. Neither should computing environment 400 be interpreted as having any dependency or requirement relating to any one or combination of components illustrated in computing environment 400.

The methods and systems described herein are operational with numerous other general purpose or special purpose computing system environments or configurations. Examples of well-known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a distributed computing environment where tasks are performed by remote processing devices that are linked through a communications network. In a distributed computing environment, program modules may be located in both local and remote memory storage devices.

With reference to FIG. 4, an exemplary system for related term suggestion for multi-sense query includes a general purpose computing device in the form of a computer 410. The following described aspects of computer 410 are exemplary implementations of client computing device PSS server 102 (FIG. 1) and/or client computing device 106. Components of computer 410 may include, but are not limited to, processing unit(s) 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 410 typically includes a variety of computer-readable media. Computer-readable media can be any available media that can be accessed by computer 410 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example and not limitation, FIG. 4 illustrates operating system 434, application programs 435, other program modules 436, and program data 437. In one implementation, wherein computer 410 is a PSS server 102. In this scenario, application programs 435 comprise search term suggestion model 112, and classification model 114. In this same scenario, program data 437 comprises term/phrase 108, suggested term list 110, historical queries 116, search query 128, search result 130, search results 132, extracted features 134, term vectors 136, keyword clusters 138, trained classifier 140, and other data 124.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that they are at least different copies.

A user may enter commands and information into the computer 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB).

A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 operates in a networked environment using logical connections to one or more remote computers, such as a remote computer 480. The remote computer 480 may be a personal computer, a server, a router, a network PC, a peer device or other common network node, and as a function of its particular implementation, may include many or all of the elements described above relative to the computer 410, although only a memory storage device 481 has been illustrated in FIG. 4. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example and not limitation, FIG. 4 illustrates remote application programs 485 as residing on memory device 481. The network connections shown are exemplary and other means of establishing a communications link between the computers may be used.

CONCLUSION

Although the systems and methods for related term suggestion for multi-sense query have been described in language specific to structural features and/or methodological operations or actions, it is understood that the implementations defined in the appended claims are not necessarily limited to the specific features or actions described. Accordingly, the specific features and actions are disclosed as exemplary forms of implementing the claimed subject matter.

The invention claimed is:

1. A computer-implemented method for related term suggestion, the method comprising:

mining search results via a multi-sense query, wherein the multi-sense query comprises:

determining terms/phrases semantically related to submitted terms/phrases, wherein semantic relationships are discovered by mining a context of the terms/phrases to determine meaning;

configuring a threshold frequency of occurrence (FOO) value;

assigning historical queries to high FOO or low FOO based on the configured threshold value;

generating term vectors from the search results associated with a set of high FOO historical queries previously submitted to a search engine; and generating term clusters as a function of calculated similarity of term vectors, wherein calculated similarity, $sim(q_j, q_k)$, is determined as follows:

$$sim(q_j, q_k) = \sum_{i=1}^{d} w_{ij} \cdot w_{ik};$$

wherein d represents vector dimension, q represents a query, k is a dimension index, and wherein weight w for the $i^{th}$ vector's $j^{th}$ term is calculated as follows:

$w_{ij}=TF_{ij}\times\log(N/DF_j)$; and wherein $TF_{ij}$ represents term frequency, N is a total number of query terms, and $DF_j$ is a number of extracted feature records that contain the $i^{th}$ vector's $j^{th}$ term;

responsive to receiving a term/phrase from an entity, evaluating the term/phrase via the multi-sense query in view of terms/phrases in the term clusters to identify one or more related term suggestions, wherein the identifying is based on a combination of FOO and a confidence value; and returning at least one suggested term list ordered by the combination of FOO and confidence value, wherein multiple suggested term lists are generated when the term/phrase matches terms in more than one term cluster.

2. The method of claim 1, and wherein the entity is a computer-program application or an end-user.

3. The method of claim 1, further comprising:

collecting historic query from a query log; and determining ones of the historic query terms with the high FOO.

4. The method of claim 1, further comprising before creating the term clusters:

reducing dimensionality of the term vectors; and normalizing the term vectors.

5. The method of claim 1, wherein evaluating further comprises:

identifying a match between die term/phrase and term(s)/phrase(s) from one or more term clusters; and responsive to identifying, generating related term suggestion(s) comprising the term(s)/phase(s).

6. The method of claim 5, wherein the related term suggestion(s) further comprise for each term/phrase of the term(s)/phrase(s), a frequency of occurrence value indicating a number of times the term/phrase occurs in a set of mined historical queries.

7. The method as recited in claim 1, wherein generating the term clusters further comprises:

sending respective ones of the high FOO historical queries to the search engine to obtain the search results;

extracting features from at least a subset of search results corresponding to the respective ones;

producing the term vectors from the features as a function of the term and inverted document frequencies.

8. The method of claim 7, and wherein the features comprise a title, description, and/or context for the respective ones of the high FOO historical query terms.

9. The method of claim 7, and wherein the respective ones comprise top ranked ones of the search results.

10. The method of claim 1, wherein the term clusters are a first set of term clusters, and wherein the method further comprises:

determining that there is no match between the term/phrase and the terms/phrases; and responsive to the determining:

making a second set of term clusters from calculated similarity of term vectors, each term vector being generated from search results associated with a set of low FOO historical queries previously submitted to the search engine; and evaluating the term/phrase in view of terms/phrases of the second set of term clusters to identify one or more related term suggestions.

11. The method of claim 10, wherein making further comprises:

identifying the low FOO historical queries from historical queries mined from the query log;

sending respective ones of at least a subset of the low FOO historical queries to the search engine to obtain search results;

extracting features from at least a subset of search results producing the term vectors from the features as a function of the term and inverted term frequencies.

12. The method of claim 11, and further comprising after clustering:

determining that there is no match between the term/phrase and term(s)/phrase(s) from the first set of term clusters, the first set being based on the high FOO historical queries; and responsive to the determining, identifying a match between the term/phrase and term(s)/phrase(s) from one or more of the second set of term clusters, the second set being based on the low FOO historical queries; and responsive to identifying, generating related term suggestion(s) comprising the term(s)/phrase(s).

13. A tangible computer-readable data storage medium comprising computer-executable instructions for executing a method, the method comprising:

mining search results via a multi-sense query, wherein the multi-sense query comprises:

determining terms/phrases semantically related to submitted terms/phrases, wherein semantic relationships are discovered by mining a context of the terms/phrases to determine meaning;

configuring a threshold frequency of occurrence (FOO) value;

assigning historical queries to high FOO or low FOO based on the configured threshold value;

generating term vectors from the search results associated with a set of high FOO historical queries previously submitted to a search engine; and generating term clusters as a function of calculated similarity of term vectors, wherein calculated similarity, sim($q_j$, $q_k$), is determined as follows:

$$sim(q_j, q_k) = \sum_{i=1}^{d} w_{ij} \cdot w_{ik};$$

wherein d represents vector dimension, q represents a query, k is a dimension index, and wherein weight w for the $i^{th}$ vector's $j^{th}$ term is calculated as follows:

$w_{ij}=TF_{ij}\times\log(N/DF_j)$; and wherein $TF_j$ represents term frequency, N is a total number of query terms, and $DF_j$ is a number of extracted feature records that contain the $i^{th}$ vector's $j^{th}$ term;

responsive to receiving a term/phrase from an entity, evaluating the term/phrase via the multi-sense query in view of terms/phrases in the term clusters to identify one or more related term suggestions, wherein the identifying is based on a combination of FOO and a confidence value; and returning at least one suggested term list ordered by the combination of FOO and confidence value, wherein multiple suggested term lists are generated when the term/phrase matches terms in more than one term cluster.

14. The computer-readable data storage medium of claim 13, and wherein the entity is a computer-program application and/or an end-user.

15. The computer-readable data storage medium of claim 13, wherein the method further comprises:

collecting historic query from a query log; and determining ones of the historic query terms with the high FOO.

16. The computer-readable data storage medium of claim 13, wherein the method further comprises:

reducing dimensionality of the term vectors; and normalizing the term vectors, wherein the reducing and normalizing are executed before creating the term clusters.

17. The computer-readable data storage medium of claim 13, wherein evaluating the term/phrase via the multi-sense query comprises:

identifying a match between the term/phrase and term(s)/phrase(s) from one or more term clusters; and responsive to identifying, generating related term suggestion(s) comprising the term(s)/phrase(s).

18. The computer-readable data storage medium of claim 17, wherein the related term suggestion(s) comprise for each term/phrase of the term(s)/phrase(s), a frequency of occurrence value indicating a number of times the term/phrase occurs in a set of mined historical queries.

19. The computer-readable data storage medium of claim 13, wherein generating the term clusters further comprises:

sending respective ones of the high FOO historical queries to the search engine to obtain the search results;

extracting features from at least a subset of search results corresponding to the respective ones;

producing the term vectors from the features as a function of the term and inverted document frequencies.

20. The computer-readable data storage medium of claim 19, and wherein the features comprise a title, description, and/or context for the respective ones of the high FOO historical query terms.

21. The computer-readable data storage medium of claim 19, and wherein the respective ones comprise top ranked ones of the search results.

22. The computer-readable data storage medium of claim 13, wherein the term clusters are a first set of term clusters, and wherein the method further comprises:

determining that there is no match between the term/phrase and the terms/phrases; and responsive to determining that there is no match between the term/phrase and the terms/phrases:

making a second set of term clusters from calculated similarity of term vectors, each term vector being generated from search results associated with a set of low FOO historical queries previously submitted to the search engine; and evaluating the term/phrase in view of terms/phrases of the second set of term clusters to identify one or more related term suggestions.

23. The computer-readable data storage medium of claim 22, wherein making a second set of term clusters comprises:

identifying the low FOO historical queries from historical queries mined from the query log;

sending respective ones of at least a subset of the low FOO historical queries to the search engine to obtain search results;

extracting features from at least a subset of search results producing the term vectors from the features as a function of the term and inverted term frequencies.

24. The computer-readable data storage medium of claim 23, wherein the method further comprising:

after clustering:

determining that there is no match between the term/phrase and term(s)/phrase(s) from the first set of term clusters, the first set being based on the high FOO historical queries; and responsive to the determining, identifying a match between the term/phrase and term(s)/phrase(s) from one or more of the second set of term clusters, the second set being based on the low FOO historical queries; and responsive to identifying, generating related term suggestion(s) comprising the term(s)/phrase(s).

25. A computing device comprising:

a processor; and a memory couple to the processor, the memory comprising computer-program instructions executable by the processor for:

mining search results via a multi-sense query, wherein the multi-sense query comprises:

determining terms/phrases semantically related to submitted terms/phrases, wherein semantic relationships are discovered by mining a context of the terms/phrases to determine meaning;

configuring a threshold frequency of occurrence (FOO) value;

assigning historical queries to high FOO or low FOO based on the configured threshold value;

generating term vectors from the search results associated with a set of high FOO historical queries previously submitted to a search engine; and generating term clusters as a function of calculated similarity of term vectors, wherein calculated similarity, $sim(q_j, q_k)$, is determined as follows:

$$sim(q_j, q_k) = \sum_{i=1}^{d} w_{ij} \cdot w_{ik};$$

wherein d represents vector dimension, q represents a query, k is a dimension index, and wherein weight w for the $i^{th}$ vector's $j^{th}$ term is calculated as follows:

$w_{ij}=TF_{ij}\times\log(N/DF_j)$; and wherein $TF_j$ represents term frequency, N is a total number of query terms, and $DF_j$ is a number of extracted feature records that contain the $i^{th}$ vector's $j^{th}$ term;

responsive to receiving a term/phrase from an entity, evaluating the term/phrase via the multi-sense query in view of terms/phrases in the term clusters to identify one or more related term suggestions, wherein the identifying is based on a combination of FOO and a confidence value; and returning at least one suggested term list ordered by the combination of FOO and confidence value, wherein multiple suggested term lists are generated when the term/phrase matches terms in more than one term cluster.

26. The computing device of claim 25, wherein the entity is a computer-program application or an end-user.

27. The computer device of claim 25, further comprising computer-program instructions executable by the processor for:

collecting historic query from a query log; and determining ones of the historic query terms with the high FOO.

28. The computing device of claim 25, before creating the term clusters, further comprising computer-program instructions executable by the processor for:

reducing dimensionality of the term vectors; and normalizing the term vectors.

29. The computing device of claim 25, wherein evaluating comprises computer-program instructions executable by the processor for:

identifying a match between the term/phrase and term(s)/phrase(s) from one or more term clusters; and responsive to identifying, generating related term suggestion(s) comprising the term(s)/phrase(s).

30. The computing device of claim 29, wherein the related term suggestion(s) further comprise for each term/phrase of the term(s)/phrase(s), a frequency of occurrence value indicating a number of times the term/phrase occurs in a set of mined historical queries.

31. The method of claim 25, wherein generating the term clusters further comprises computer-program instructions executable by the processor for:

sending respective ones of the high FOO historical queries to the search engine to obtain the search results;

extracting features from at least a subset of search results corresponding to the respective ones;

producing the term vectors from the features as a function of the term and inverted document frequencies.

32. The computing device of claim 31, and wherein the features comprise a title, description, and/or context for the respective ones of the high FOO historical query terms.

33. The computing device of claim 31, and wherein the respective ones comprise top ranked ones of the search results.

34. The computing device of claim 25, wherein the term clusters are a first set of term clusters, and wherein the computer-executable instructions further comprise instructions for:

determining that there is no match between the term/phrase and the terms/phrases; and responsive to the determining:

making a second set of term clusters from calculated similarity of term vectors, each term vector being generated from search results associated with a set of low FOO historical queries previously submitted to the search engine; and evaluating the term/phrase in view of terms/phrases of the second set of term clusters to identify one or more related term suggestions.

35. The method of claim 34, wherein making a second set of term clusters comprises computer-executable instructions for:

identifying the low FOO historical queries from historical queries mined from the query log;

sending respective ones of at least a subset of the low FOO historical queries to the search engine to obtain search results;

extracting features from at least a subset of search results producing the term vectors from the features as a function of the term and inverted term frequencies.

36. The computing device of claim 35, and further comprising computer-program instructions executable by the processor after clustering, for:

determining that there is no match between the term/phrase and term(s)/phrase(s) from the first set of term clusters, the first set being based on the high FOO historical queries; and responsive to the determining, identifying a match between the term/phrase and term(s)/phrase(s) from one or more of the second set of term clusters, the second set being based on the low FOO historical queries; and responsive to identifying, generating related term suggestion(s) comprising the term(s)/phrase(s).

37. A computing device comprising at least one processor, the device further comprising:

means for mining search results via a multi-sense query, wherein the multi-sense query comprises:

means for determining terms/phrases semantically related to submitted terms/phrases, wherein semantic relationships are discovered by mining a context of the terms/phrases to determine meaning;

means for configuring a threshold frequency of occurrence (FOO) value;

means for assigning historical queries to high FOO or low FOO based on the configured threshold value;

means for generating term vectors from the search results associated with a set of high FOO historical queries previously submitted to a search engine; and means for generating term clusters as a function of calculated similarity of term vectors, wherein calculated similarity, $\mathrm{sim}(q_i, q_k)$, is determined as follows:

$$\mathrm{sim}(q_j, q_k) = \sum_{i=1}^{d} w_{ij}, w_{ik};$$

wherein d represents vector dimension, q represents a query, k is a dimension index, and wherein weight w for the $i^{th}$ vector's $j^{th}$ term is calculated as follows:

$w_{ij}=TF_{ij}\times\log(N/DF_j)$; and wherein $TF_j$ represents term frequency, N is a total number of query terms, and $DF_j$ is a number of extracted feature records that contain the $i^{th}$ vector's $j^{th}$ term;

responsive to receiving a term/phrase from an entity, means for evaluating the term/phrase via the multi-sense query in view of terms/phrases in the term clusters to identify one or more related term suggestions, wherein the identifying is based on a combination of FOO and a confidence value; and means for returning at least one suggested term list ordered by the combination of FOO and confidence value, wherein multiple suggested term lists are generated when the term/phrase matches terms in more than one term cluster.

38. The computing device of claim 37 and wherein the entity is a computer-program application and/or an end-user.

39. The computing device of claim 37, further comprising computer-program instructions executable by the processor for:

collecting means to collect historic query terms from a query log; and determining means to determine ones of the historic query terms with the high FOO.

40. The computing device of claim 37, wherein the evaluating means further comprise:

identifying means to identify a match between the term/phrase and term(s)/phrase(s) from one or more term clusters; and responsive to identifying, generating means to generate related term suggestion(s) comprising the term(s)/phrase(s).

41. The computing device of claim 37, wherein the generating means to generate the term clusters further comprise:

sending means to send respective ones of the high FOO historical queries to the search engine to obtain the search results;

extracting means to extract features from at least a subset of search results corresponding to the respective ones;

producing means to produce the term vectors from the features.

42. The computing device as recited in claim 37, wherein the term clusters are a first set of term clusters, and wherein the computing device further comprises:

determining means to determine that there is no match between the term/phrase and the terms/phrases; and responsive to the determining:

making means to make a second set of term clusters from calculated similarity of term vectors, each term vector being generated from search results associated with a set of low FOO historical queries previously submitted to the search engine; and evaluating means to evaluate the term/phrase in view of terms/phrases of the second set of term clusters to identify one or more related term suggestions.

43. The computing device of claim 42, and further comprising:

calculating means to calculate that there is no match between the term/phrase and term(s)/phrase(s) from the first set of term clusters, the first set being based on the high FOO historical queries; and responsive to the calculating, identifying means to identify a match between the term/phrase and term(s)/phrase(s) from one or more of the second set of term clusters, the second set being based on the low FOO historical queries; and responsive to identifying, generating means to generate related term suggestion(s) comprising the term(s)/phrase(s).

* * * * *